Feb. 5, 1946.　　　　G. W. PANCOE　　　　2,394,523
SAFETY HARNESS AND CONTROL APPARATUS THEREFOR
Filed Aug. 17, 1942　　　4 Sheets-Sheet 1

INVENTOR
George W. Pancoe
BY *John P. Parker*
ATTORNEY

Feb. 5, 1946.  G. W. PANCOE  2,394,523
SAFETY HARNESS AND CONTROL APPARATUS THEREFOR
Filed Aug. 17, 1942  4 Sheets-Sheet 2

INVENTOR
George W. Pancoe
BY John P. Darby
ATTORNEY

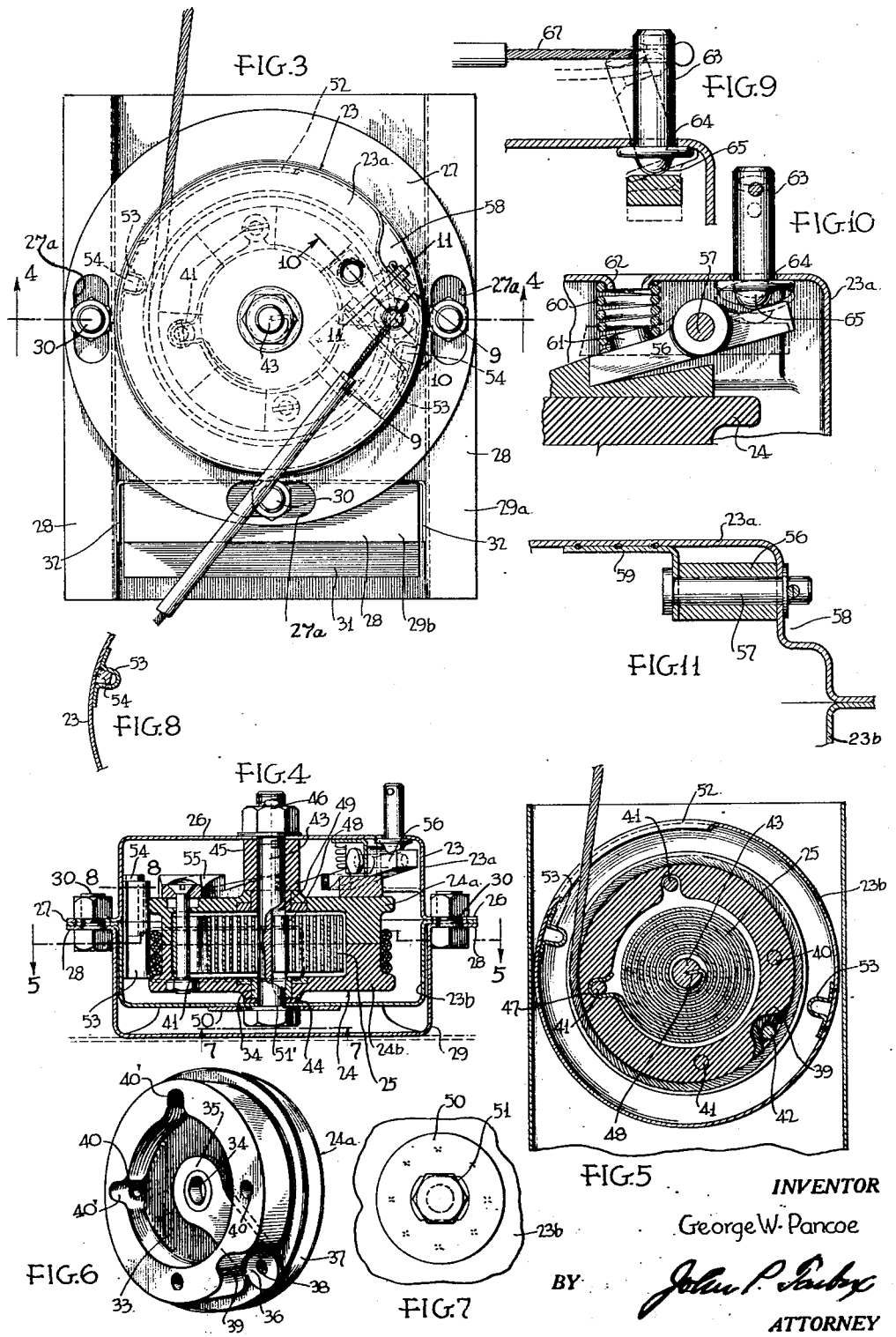

Feb. 5, 1946. G. W. PANCOE 2,394,523
SAFETY HARNESS AND CONTROL APPARATUS THEREFOR
Filed Aug. 17, 1942 4 Sheets-Sheet 4
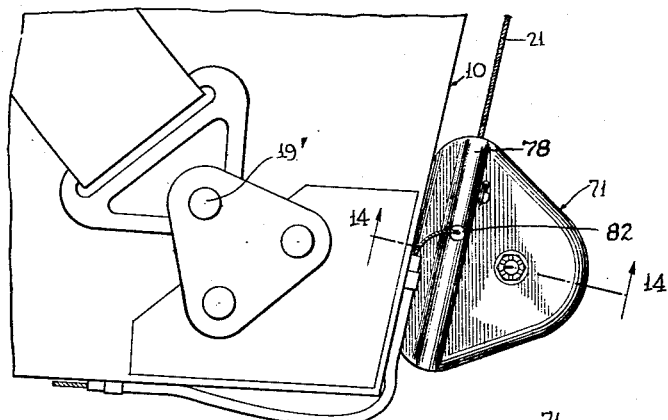
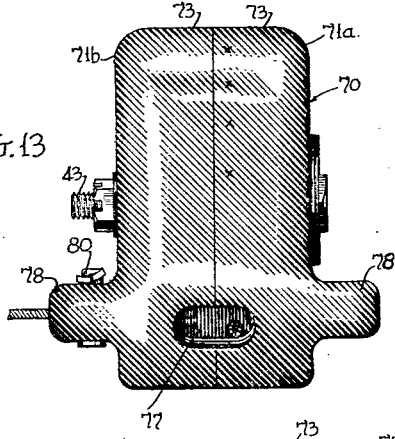
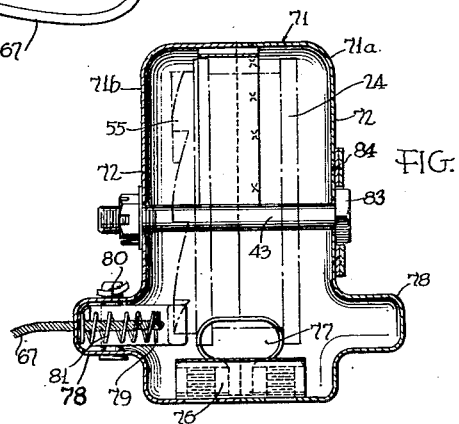
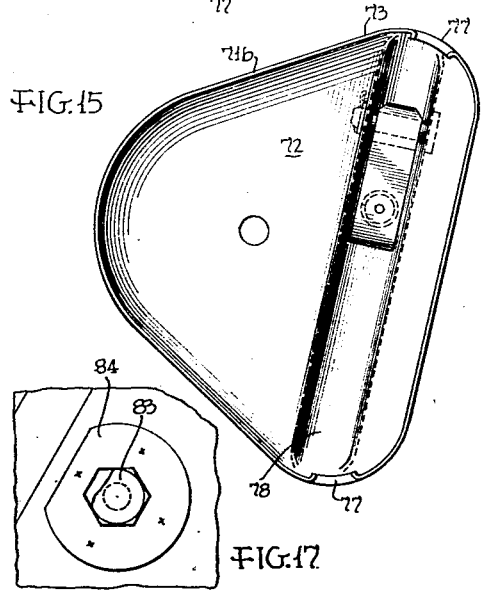
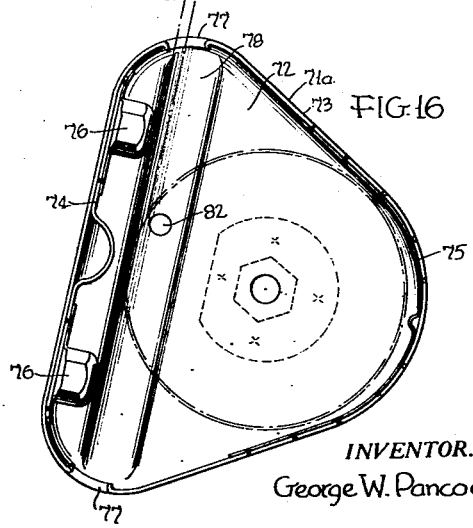
INVENTOR.
George W. Pancoe.
BY
ATTORNEY.

Patented Feb. 5, 1946

2,394,523

UNITED STATES PATENT OFFICE 2,394,523

SAFETY HARNESS AND CONTROL APPARATUS THEREFOR

George W. Pancoe, Philadelphia, Pa., assignor to Edward G. Budd Manufacturing Company, Philadelphia, Pa., a corporation of Pennsylvania Application August 17, 1942, Serial No. 455,075

4 Claims. (Cl. 242—107)

The invention relates to a safety harness and control apparatus therefor.

It is an object of my invention to provide a safety harness of this class which is light in weight, can readily be applied to the seat with which it is used, is easy to manufacture, and easy to adjust to the desired condition. Ordinarily such harnesses are associated with the seats occupied by the crew and passengers on airplanes. In view of the demand for saving of weight and space in such structures, lightness of weight and compactness of construction are important considerations. Other factors are ease of adjustment, particularly in the case of a pilot's seat, to enable him to lean forward when desired, in the control of the airplane, or to be held erect against the back of the seat when cruising.

These objects are attained in a very high degree in the construction and apparatus according to this application. The harness per se may be of a usual form which has two shoulder straps passing one over each of the shoulders of the occupant of the seat with which the apparatus is associated. These shoulder straps are secured at the front by a quick releasable means of usual form to lap straps anchored at their opposite ends to the sides of the seat, respectively.

The rear ends of the harness, after passing over the back of the seat are secured together and to a flexible member, as a cable, which is connected to anchoring and adjusting means secured to the bottom portion of the seat back. The anchoring and adjusting means comprise a readily assemblable casing housing a drum, upon which the flexible member is wound, and this drum is normally urged by a spring in a direction to wind up the member onto the drum. A simple clutch device comprising a pawl and ratchet is associated with the drum and casing for normally locking the drum against rotation counter to the direction in which it is rotated by the spring. The drum and casing are each constructed in two parts divided centrally of the plane of the drum to facilitate ready manufacture and assembly of the device.

To enable the occupant of the seat to lean forward against the tension of the spring, a control means connected to release the clutch device, is mounted at the side of the seat where it is close to the hand of the occupant when seated in relaxed position. In this position, it is instantly available to the occupant to move it to either of two positions, one in which the drum is released and the other in which the drum is locked. A simple releaes device is connected with this control means for releasing the pawl of the clutch device from its ratchet secured to the drum.

Other and further objects and advantages and the manner in which they are attained will become apparent from the following detailed description when read in connection with the drawings forming a part hereof.

In the drawings:

Fig. 3 is a rear elevational view, on an enlarged scale, of the anchoring and adjusting apparatus and the manner of mounting it on the back of the seat;

Fig. 4 is a detail horizontal sectional view taken substantially along the line 4—4 of Fig. 3;

Fig. 5 is a sectional view taken substantially on the line 5—5 of Fig. 4;

Fig. 6 is a perspective view of one-half section of the winding drum;

Fig. 7 is a fragmentary elevational view taken substantially on the line 7—7 of Fig. 4;

Fig. 8 is a fragmentary detail sectional view taken substantially on the line 8—8 of Fig. 4;

Figure 1:
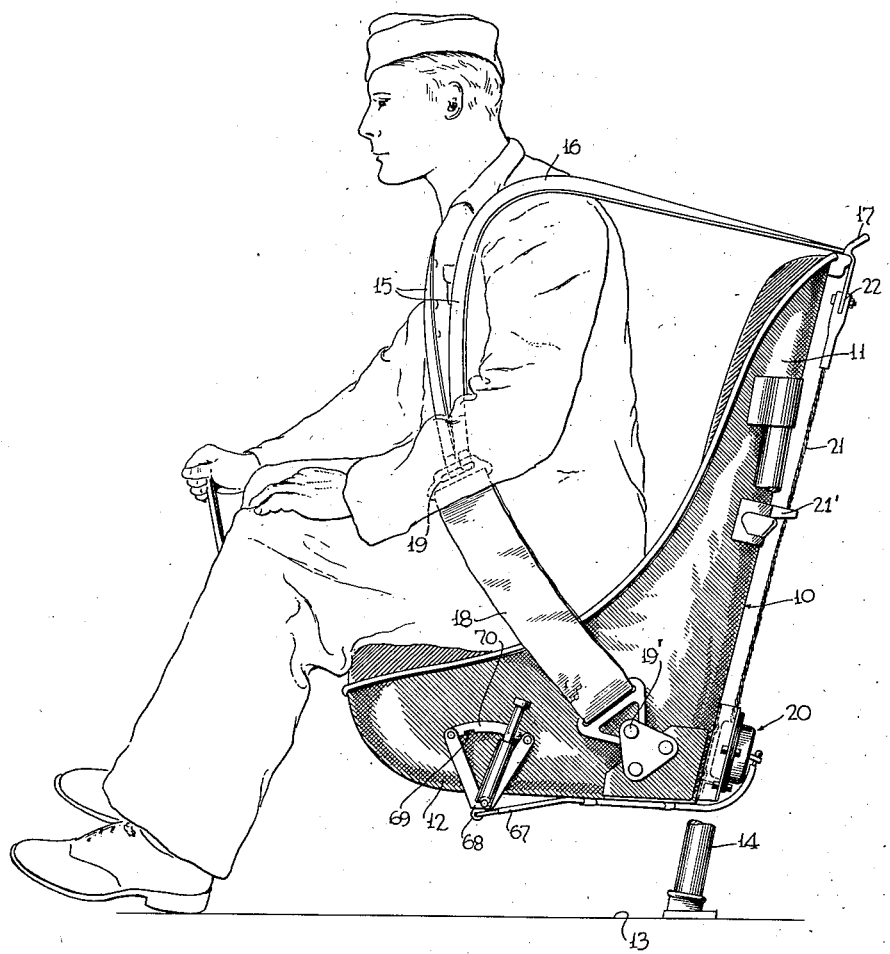
Fig. 1 is a side elevational view of a pilot's seat with a pilot seated therein showing the safety harness and associated apparatus mounted on the seat and adjusted to permit the pilot to lean forward.

Figs. 9, 10 and 11 are fragmentary detail sectional views on an enlarged scale taken, respectively, substantially along the lines 9—9, 10—10 and 11—11 of Fig. 3;

Fig. 12 is a fragmentary side elevation of the rear lower portion of a seat showing a modified form of the casing for the winding drum;

Fig. 13 is an end elevation of the modified form of casing;

Fig. 14 is a cross section thereof on an enlarged scale taken substantially on the line 14—14 of Fig. 12 with the drum shown in dot-and-dash lines;

Figs. 15 and 16 are inside elevational views, respectively, of the left-hand half and the right-hand half of the casing of Figs. 13 and 14; and Fig. 17 is a fragmentary elevational view, similar to Fig. 7, as seen from the right of Figs. 13 and 14, with parts broken away.

In the drawings, the invention is shown associated with a pilot's seat, such as a usual type of bucket seat 10, having a back portion 11 and a seat portion 12 and supported from the floor of the plane, indicated at 13, by the inclined stanchions, as 14, secured respectively to the seat and floor.

The safety harness is shown as comprising a pair of shoulder straps 15 passing over the shoulders of the pilot, 16, their rear ends passing over the back portion 11 of the seat and through a suitable guide 17 which maintains them in position laterally. The front ends of the shoulder straps 15 are connected to the seat portion 12 indirectly by a pair of lap straps, as 18. These latter are suitably anchored, as at 19', to the sides of the seat portion 12 and have their inner ends secured to the forward ends of the shoulder straps as by a suitable quick-release device, diagrammatically indicated at 19. It is understood of course that the straps may, as usual, be provided with suitable means for adjusting their lengths to fit the occupant of the seat.

The anchoring and adjusting means for taking up the slack in the shoulder straps 15 and anchoring their rear ends in adjusted position is indicated generally by the reference character 20. The rear ends of these straps are secured together and to a flexible tension member, such as cable 21 at 22, this cable passing down the back of the seat through a suitable guide, as 21', secured to the back, to its connection with the anchoring and adjusting device 20.

Figure 2:
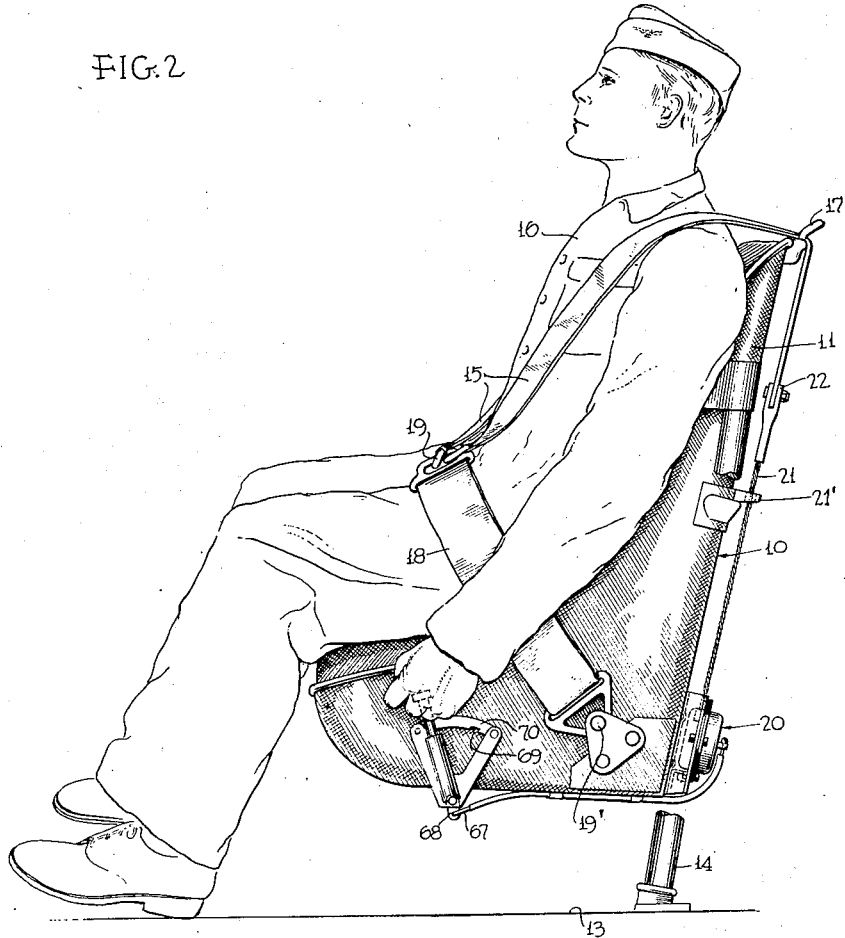
Fig. 2 is a similar view showing the harness adjusted and locked in position securing the body of the pilot in upright position against the back of the seat.

Said device is designed at all times to take up the slack in the harness and subject to the operator's control, to hold the operator firmly to the seat, as indicated in Fig. 2. It is to this device and the control therefor that the invention is primarily directed. The device is designed for lightness with adequate strength, compactness, convenience of assembly and disassembly and ready securement as a unit to the back of the seat where it is located in an out-of-the-way position.

The device may comprise a light-gauge sheet metal casing 23 in which is rotatably mounted a drum 24 upon which the cable 21 is wound, a spring 25 constantly urging the drum to rotate in a direction to wind up the cable and draw the harness taut.

This casing 23 may comprise two substantially identical parts 23a and 23b, each designed to be formed to substantially final form on the same dies. Each part comprises a cup-shaped body 26 having a peripheral flange 27. When the casing parts are assembled, as shown in Fig. 4, the flanges 27 overlap and the assembled casing is readily secured to the flanges 28 of a sheet metal bracket 29 as by the bolts 30.

The bracket 29 is shown fabricated of two parts, 29a and 29b. Part 29a may be a wide and deep channel of a width and depth to receive the body of one of the casing parts, as 23b, between its side walls, and having its bottom wall overlapping the sheet metal seat back portion adjacent the bottom of the latter and strongly secured thereto, as by spot welding. The other part 29b may be a laterally facing channel having a widened side wall 31, see Fig. 3, secured as by spot welding to the bottom wall of the channel 29a. The bottom wall of this channel has lateral extensions 32 overlapping and secured to the side walls of channel 29a. Its top side wall forms a flange 28, in the plane of the flanges 28 on the main part 29a. As appears in Fig. 3, the casing 23 is secured to each of the flanges 28 by a bolt 30, and to permit adjustable securement, the bolts pass through slots, as 27a.

The drum 24, for compactness, houses the spring 25, and for convenience of assembly and manufacture it is made in two identical parts 24a, 24b divided in the central plane of the drum. Each of these parts 24a, 24b may be and preferably is made of a moldable composition, such as a thermally hardening moldable composition, and, since the parts are identical, they may be formed in the same mold. Each part is provided with a central cylindrical recess 33 and with a central bearing bushing 34 to which the hub 35 of a radially extending arm 36 is secured. In the manufacture, the arm 36 and bushing 34 are, of course, suitably disposed in a mold and the body of the drum part is molded around them. The outer end of the arm 36 terminates within the periphery of the flange 37 of the drum part and is provided with an opening 38. A transverse hole is drilled in the drum part in alignment with said opening 38 and the face of the drum part upon which the cable is wound is provided in this region with a transverse recess 39. An annular series of holes 40, equally spaced from each other, and, as shown, four in number, are also drilled transversely of the drum parts and a transverse recess, as 40', may surround one or two of these holes. Two are shown in Fig. 6.

In the final assembly, the two parts of the drum are clamped together by bolts 41 passing through the four aligned holes in said parts and additionally by a bolt, as 42, which passes through the openings 38 and recesses 39, the end of the cable secured to the drum being securely clamped between the face of the recesses 39 and the bolt 42, as shown in Fig. 5. The bolts 41 may have their non-circular nuts seated in correspondingly shaped recesses in the face of a drum part as 44b, and may be tightened by having screw driver slots in their heads.

The drum, when so assembled, is rotatably mounted in the casing 23 by a bolt 43 passing through the bearing bushings 34 of the drum, the spacing bushings 44 and 45, respectively, between the opposite sides of the drum hub and the adjacent wall of the casing. This single bolt 43 serves to secure the drum and the casing parts in assembled relation. It is not drawn up tight enough to interfere with the free rotation of the drum. When suitably drawn up, the nut of the bolt may be locked by suitable means such as a cotter pin 46.

In the assembly of the two drum parts, one end of the spring 25 is arranged with its outer end looped as at 47 against the face of an aligned pair of recesses 40' and this end of the spring is securely fastened to the drum by having its looped end 47 clamped between the face of the recesses and the bolt 41 extending therethrough, see Fig. 5.

The inner end of the spring has a bent end 48 which is adapted to fit within a slot 49 extending substantially the length of the bolt 42, see Fig. 4. When the bolt is inserted in the assembled parts, it is turned until the slot 49 therein is lined up with the bent end 48 of the spring, whereupon the bolt may be shoved home and the nut applied.

Provision is made to prevent rotation of the bolt 43 with respect to the casing 23. Such means may comprise a plate 50 secured to the outer face of the casing part 23b as by spot welding, see Figs. 4 and 7, this plate surrounding the bolt 23 and having a slot 51 formed therein. This slot 51 has parallel rectilinear side faces engaging similar faces on a shoulder 51' under the head of the bolt, and thereby preventing rotation of the bolt with respect to the casing when the parts are assembled, as in Fig. 4.

However, if the nut is slacked off sufficiently to remove the shoulder 51' from the slot 51, the bolt 43 may be turned by applying a wrench to its head to place the spring under the proper tension. After such tensioning and while the bolt is held against turning, the nut is tightened and the shoulder 51' is again brought into interlocking relation with the slot 51.

The cable may, when the parts are properly adjusted pass around the drum for several turns, as shown in Fig. 4, and then pass out through slot 52, see Fig. 3, formed in one of the casing parts.

The casing parts 23a and 23b may be properly angularly aligned by the means shown in Figs. 3, 4, 5 and 8. Such means may comprise channels 53 welded to diametrically opposite sides of one of the casing parts, as 23b, and extending beyond said part toward the other part, as 23a. The part 23a has splines as 54 welded at diametrically opposite sides thereof and extending beyond said part toward the other. In assembling the parts the splines 54, which are of a width to slidingly fit the channels 53, are brought into alignment therewith after which the parts are moved toward each other and thus locked against rotation with respect to each other.

By this arrangement, alignment of the slots 32 in the two parts through which the securing bolts 30 pass is assured. Also, since one of the channels 53 is arranged adjacent the point where the cable comes off the drum, it may serve as a guide to insure proper winding of the cable on the drum, see Figs. 3 and 4.

With the arrangement so far described, with the spring 25 properly tensioned, the cable 21 will be similarly tensioned and exert a definite pull on the shoulder straps 15 of the harness. The pilot, by overcoming this tension, may lean forward as shown in Fig. 1 to operate the controls of the plane. At certain times, however, it is desirable that the harness secure him firmly in his seat, and to insure this locking, a one-way clutch device is provided in association with the drum 24. Such device may comprise an annular ratchet 55 secured to one face of the drum, such securement preferably being by the same series of bolts 41 which secure the drum parts 24a and 24b together. To cooperate with this ratchet in locking the drum to prevent rotation thereof in a direction unwinding the cable 21, a suitable pawl 56, see Figs. 4, 9 and 10, is provided.

The pawl 56 is pivoted intermediate its ends on a pin 57 which is supported adjacent one end by an indented portion 58 of the wall of the casing part 23a and at its opposite end by an angle bracket 59 spot welded to the bottom wall of the casing part, see Fig. 11.

The pawl is normally urged into engagement with the ratchet by a coil spring, as 60, interposed between the end of the pawl adjacent the ratchet and the bottom wall of casing part 23a. A boss 61 on the pawl and an indented portion 62 of the casing hold the spring in place. The opposite end of the pawl extends into proximity to the bottom wall of the casing, Fig. 10, and means are provided under the control of the pilot sitting in the seat for engaging this end of the pawl to swing it against its spring out of engagement with the ratchet, thereby releasing the drum to the action of its spring 25 alone.

Such control means may comprise a trip 63 for engaging the pawl, this trip in the instant case being a headed pin, the head 64 of which is of relatively large diameter as compared with the body of the pin and has a central bulge 65 normally in engagement with the releasing arm of the pawl. In this position the base of the head 64 is substantially parallel to the bottom wall of the casing part 23a and the stem of the pin projects through a loose-fitting opening in the casing wall to the outside.

The outer end of this pin is connected by a flexible device such as a Bowden cable 67 to a control lever 68 mounted at the side of the pilot's seat in a position where it may be readily grasped by the hand of the pilot when hanging down in relaxed position. The control lever can be shifted to and locked in either of two positions indicated by the notches 69 in the sector bracket 70 secured to the side of the pilot's seat and pivotally supporting the control lever.

When the lever is in the position shown in Fig. 1, the Bowden cable has tilted the tripping pin 63 to the dotted line position, see Figs. 9 and 10, in which the pawl has been moved to and is being held in release position. On the other hand, when the lever is moved to the position shown in Fig. 2, the tripping pin is returned to the full-line position of Figs. 9 and 10, in which the pawl is operative to lock the drum against movement to allow the cable to pay out. Even when the drum is released by the pawl, the spring will always hold the pilot in the seat under some tension. If he leans forward, the cable will pay out under the spring tension, and consequently the slack will be immediately taken up on his return to normal upright position.

The form of the invention shown in Figs. 12 to 17, inclusive, is the preferred form since it simplifies the attachment of the casing to the seat and provides for a more compact overall construction. It differs from the form already described principally in the form of the casing. In this form the casing designated as a whole by the numeral 71 is also constructed of two substantially identical halves 71a and 71b. The main body of these halves may be stamped from the same dies.

As shown, each is of generally triangular configuration, in side elevation, and has a flat main body 72 which terminates in its periphery in a continuous flange 73 extending at substantially right angles to the body. When the halves are assembled, as shown in Fig. 13, the edge of these flanges abut in the central plane of the casing.

The casing parts 71a and 71b are guided and held in the proper relative positions during and after assembly by a pair of strips, as 74 and 75, welded to the inner face of the flange 73 of one of the casing parts and extending therebeyond for telescoping engagement with the flange 73 of the other casing part.

The one strip, as 74, is attached to what may be called the flat base portion of flange 73 and the other, as 75, extends around the rounded portion opposite said base portion, see Fig. 16.

To the strip 74 are secured four spaced nuts as 76, two on each side of the central plane of the completely assembled casing, and opposite these nuts the casing flanges 73 and strips 74 are perforated to permit the passage of bolts, not shown, by which the casing may be secured to the back of the seat 10 in the position indicated in Fig. 12. When so secured these securing bolts, as well as the bolt 43, will serve to hold the casing parts in assembled relation.

At the opposite ends of the base portion, the casing parts are provided with transversely elongated openings, as 77, half of each of which openings being formed in each casing part. The upper opening serves for the passage of the cable 21 to the drum 24, and the lower may serve as a drainage opening.

Parallel to the base portion, each casing part is formed with an outwardly extending rib 78 providing an inwardly facing channel, this channel in one of the casing parts, as 71b, receiving the pawl, as 79, for interlocking engagement with the ratchet 55 of the drum 24.

This pawl is mounted on a pin 80 extending through the associated rib 78 and is normally urged into locking engagement with the ratchet by a spring, as 81. The cable 67 of the releasing gear may be connected as shown to the pawl and pass through the coils of the spring 80 through an opening, as 82, to the outside of the casing. The openings in the rib 78 to receive the pin 80 and the opening 82 may be duplicated on both halves 71a and 71b of the casing so that they may be fully interchangeable.

The means for locking the bolt 43 against rotation when the parts are assembled, as shown in Fig. 14, differs slightly from the form shown in Fig. 7. According to this modification, the non-circular head, as 83, is received in a correspondingly shaped opening formed in the plate 84 spot welded to the body of the casing part 71a. Its operation is, however, identical to that of the form shown in Fig. 7.

While I have herein described in detail several preferred embodiments of the invention, it will be understood that changes and modifications may be made by those skilled in the art which do not depart from the main features of the invention, and it is my intent to cover all such changes and modifications in the claims appended hereto.

What is claimed is:

1. Anchoring and adjusting means for use with safety apparatus of the class described comprising a winding drum divided into substantially identical halves transversely of its axis, and means for securing said halves together including an anchoring bolt for the end of a flexible element adapted to be wound on the drum, said bolt passing through a recess in the cylindrical face of the drum and being adapted to clamp the end of said flexible element in place.

2. An article of manufacture for use with safety apparatus of the class described comprising a molded half-section of a drum having a central recess therein for receiving, when combined with a similar half-section, a spring for biasing the drum to rotate in one direction, said half section including a bearing bushing embedded therein for rotatably mounting the drum upon a spindle and a reinforcing arm also embedded therein and extending from said bushing substantially to the periphery of the drum and there adapted to be connected to the end of a flexible member to be wound on the drum.

3. A take-up device comprising a drum, a casing for the drum, a bolt passing through the central portion of the drum and through the casing on opposite sides of the drum and forming a spindle for the drum and a means for holding the casing parts together, a spring housed within the drum and having one end anchored thereto and the other end to said bolt, said bolt having a slot connection with the spring allowing axial movement of the bolt without disengagement from the spring, and means between the bolt and casing for normally locking the bolt against rotation in the casing but permitting such rotation of the bolt when it is slightly backed off from its normal condition, in which backed off condition the bolt retains its function of holding the parts together.

4. A take-up device comprising a casing formed of two parts flanged peripherally and when assembled having their peripheral flanges abutting, a drum mounted therein, and a single central securing bolt securing the parts of the casing in assembled relation, and rotatably mounting said drum, the peripheral flanges of the casing parts providing a peripheral face of non-circular form having a flat attaching face portion for mounting the casing on a support, and securing means adapted to co-operate with means for attaching the casing to a support mounted on the inner face of said flat attached face portion.

GEORGE W. PANCOE.